United States Patent [19]

Gaubert

[11] 4,435,613

[45] Mar. 6, 1984

[54] SEMICONDUCTOR PACKING COMPOSITION FOR AN UNDERSEA CABLE, A CABLE CONTAINING SAID SUBSTANCE AND A METHOD OF MANUFACTURING SUCH A CABLE

[75] Inventor: Jean Gaubert, St-André de Corcy, France

[73] Assignee: Les Cables de Lyon, Clichy, France

[21] Appl. No.: 370,222

[22] Filed: Apr. 20, 1982

[30] Foreign Application Priority Data

Apr. 30, 1981 [FR] France .................. 81 08653

[51] Int. Cl.³ .............. H01B 7/14; H01B 1/24; H01B 13/22
[52] U.S. Cl. .............. 174/102 SC; 156/48; 156/54; 156/56; 174/23 C; 174/102 D; 174/107; 252/511
[58] Field of Search ............ 174/23 R, 23 C, 102 D, 174/102 SC, 106 D, 106 SC, 107, 120 SC; 252/511; 156/48, 54, 56

[56] References Cited

U.S. PATENT DOCUMENTS

| | | | |
|---|---|---|---|
| 3,733,225 | 5/1973 | Moody | 156/54 X |
| 3,836,695 | 9/1974 | Strecker et al. | 174/23 C |
| 4,033,800 | 7/1977 | Ollis | 156/48 |
| 4,095,039 | 6/1978 | Thompson | 174/23 C |
| 4,104,480 | 8/1978 | Thompson | 174/23 C |
| 4,109,098 | 8/1978 | Olsson et al. | 174/106 SC |
| 4,145,567 | 3/1979 | Bahder et al. | 174/107 |
| 4,221,926 | 9/1980 | Schneider | 156/56 X |
| 4,225,749 | 9/1980 | Pierre et al. | 174/102 D X |
| 4,256,921 | 3/1981 | Bahder | 174/106 D X |

FOREIGN PATENT DOCUMENTS

| | | | |
|---|---|---|---|
| 830182 | 3/1960 | United Kingdom | 174/23 C |
| 1484850 | 9/1977 | United Kingdom | 174/23 C |

Primary Examiner—G. P. Tolin
Assistant Examiner—Morris H. Nimmo
Attorney, Agent, or Firm—Sughrue, Mion, Zinn, Macpeak & Seas

[57] ABSTRACT

A semiconductor packing substance for an undersea cable transporting electrical power, said cable having a core made of conductors 1 disposed axially, surrounded by a polyethylene layer 3 which is made semiconductive, then by a layer of insulating polyethylene (4). The packing substance is obtained by reticulating liquid nitrile rubber with carboxylic bonds and an epoxy resin to both of which is added a carbon black with a specific surface area at least equal to 100 m²/g, an anti-oxidizing agent and a reticulation accelerator.

7 Claims, 2 Drawing Figures

SEMICONDUCTOR PACKING COMPOSITION FOR AN UNDERSEA CABLE, A CABLE CONTAINING SAID SUBSTANCE AND A METHOD OF MANUFACTURING SUCH A CABLE

The present invention relates to a semiconductor packing substance or composition for an undersea cable which transmits electric power, said cable having a core made of conductors disposed axially, surrounded by a polyethylene layer which is made semiconductive then by a layer of insulating polyethylene which itself may optionally be coated with a further semiconductive layer. The invention also relates to cables which comprise said packing sustance and to a method of manufacturing such cables.

BACKGROUND OF THE INVENTION

In undersea cables for transporting power, up to a recent date, the conductors were insulated by means of paper strips impregnated with viscous substances such as grease or petroleum tar. The interstices between the conductors were then filled with packing substances also made of viscous substances.

When impregnated paper tape insulant was replaced by polyethylene insulant, it was observed that the packing substances formed by viscous substances melted when the insulant was installed by extrusion and migrated into the insulant, thereby considerably disturbing its dielectric properties.

Les Cables de Lyon's published French patent specification No. 2 407 557 dated Oct. 27, 1977, recommends substituting rods of plastics substances in which cellulose fibres are fixed for a packing substance between a polyethylene insulant and a screen with longitudinal corrugations. Said fibres swell when the rods are placed in water and thereby prevent water propagating. However, it is not possible to assemble such rods with metal conductors in a die.

Preferred embodiments of the present invention mitigate these draw-backs and provide a semiconductor packing substance for an undersea cable, which substance provides just as good sealing against the longitudinal propagation of water as previously known viscous substances while not melting when the insulant is installed by extrusion nor disturbing the dielectric properties thereof.

SUMMARY OF THE INVENTION

The present invention provides: a semiconductor packing substance or composition for an undersea cable for transporting electrical power, said cable having a core made of conductors disposed axially, surrounded by a polyethylene layer which is made semiconductive, then by a layer of insulating polyethylene, wherein said packing substance is obtained by reticulating liquid nitrile rubber with carboxylic bonds and an epoxy resin to both of which is added a carbn black with a specific surface area at least equal to 200 $m^2/g$, an anti-oxidizing agent and a reticulation accelerator.

Preferably, the anti-oxidizing agent is octyldiphenylamine and the reticulation accelerator is tri (dimethylaminoethyl) phenol.

The present invention also provides an undersea cable including a packing substance such as defined hereinabove, disposed between the conductors of the core and possibly in the longitudinal corrugations of the metal screen when the cable is equipped with such a screen.

In a further aspect the present invention provides a method of manufacturing a cable as defined above wherein the conductors of the core are assembled in a known way to form a cord in a die, and wherein the packing substance is injected under high pressure in said die, the substance then being left to harden, then a layer of polyethylene made semiconductive is drawn over said substance and over the polyethylene insulant, and wherein the packing substance is deposited in the longitudinal corrugations of the metal screen possibly in calibrated thicknesses when said substance is laid around the insulant.

BRIEF DESCRIPTION OF THE DRAWINGS

An undersea cable for transporting power and an installation for manufacturing the core of said cable are described below by way of example and with reference to the accompanying drawings in which.

MORE DETAILED DESCRIPTION

Figure 1:
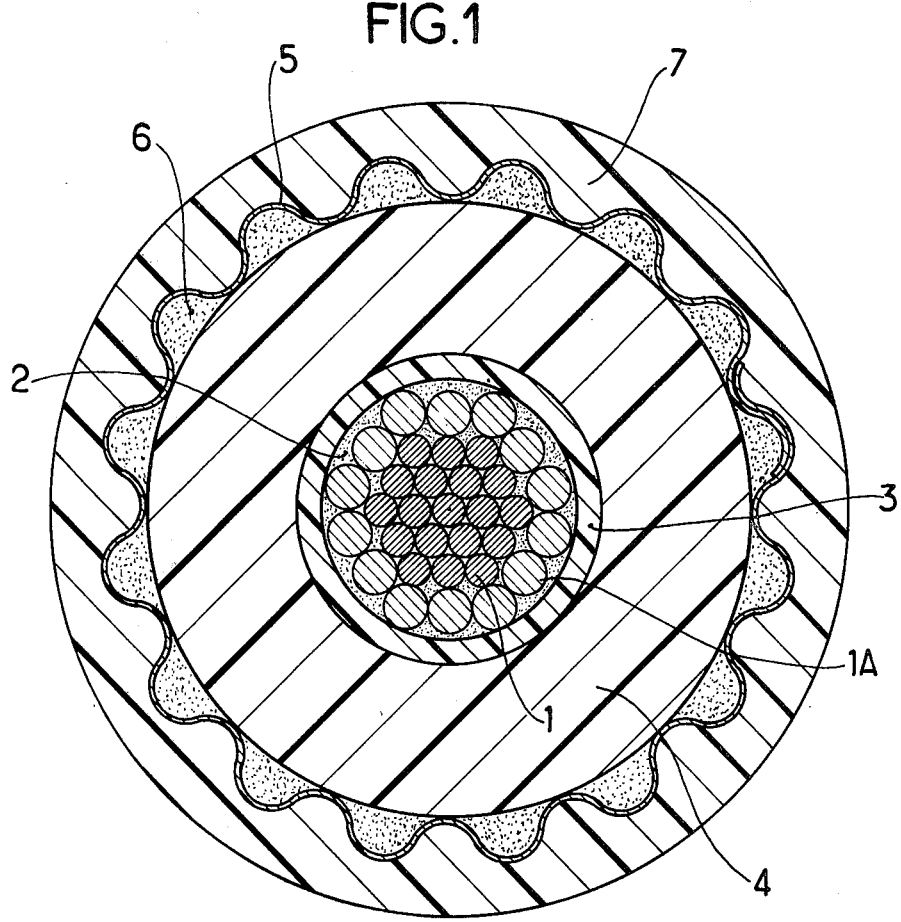
FIG. 1 is a cross-section through the cable.

In FIG. 1, a cable has conductors 1 made of copper or aluminium and embedded in a packing substance or composition 2 injected at a high pressure.

Said packing substance or composition contains:

100 parts of reticulated nitrile rubber with carboxylic bonds, in particular the one commercialized under the trade name Hycar CTBN 1300×8.

25 parts of an epoxy resin, in particular the one commercialized by Shell under the trade name Epikote 828.

a few percent of the antioxidizing agent octyldiphenylamine.

10 parts of carbon black with a specific surface area of 350 $m^2/g$.

a few percent of tri (dimethylamino-ethyl) phenol accelerator.

The core formed by the conductors embedded in the packing substance is surrounded by a layer 3 of polyethylene made semiconductive by adding carbon powder. Said layer is itself surrounded by insulating polyethylene 4.

An aluminium or copper screen 5 with longitudinal corrugations is disposed around the insulating polyethylene 4; the interstices between the outer surface of the polyethylene insulant and the corrugations of the screen are themselves filled with the same packing substance 6 as that between the conductors.

The cable is completed by an outer sheath 7 and optionally by a reinforcement of steel wires, not shown.

Figure 2:
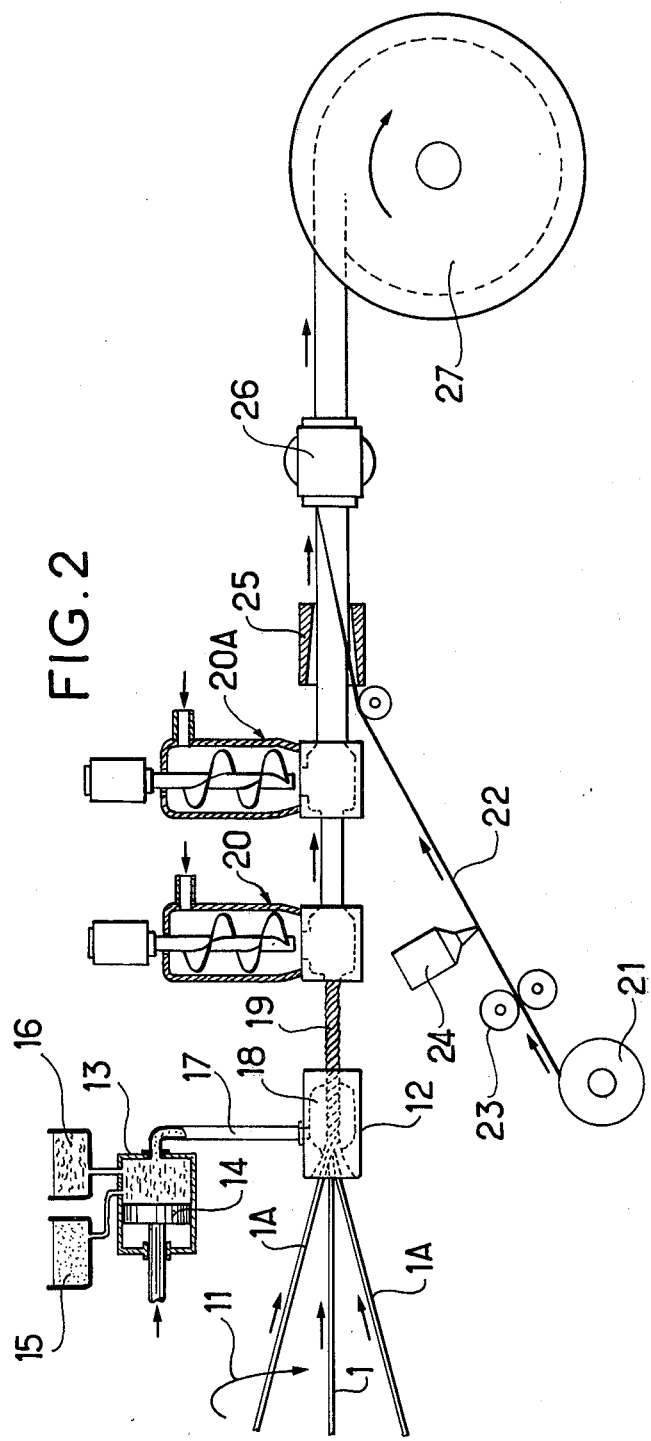
FIG. 2 is a side elevational view which schematically illustrates an installation for manufacturing the cable core.

In FIG. 2, the conductors 1 intended to form the cable core are brought to a die 12 with a rotation movement (arrow 11) about a general axis of cable advance, said rotation being superposed on a translation movement along said axis. Said die also receives the packing substance from an injection pump 13 which is itself fed with nitrile rubber and epoxy resin by the premixers 15 and 16 in which the antioxidizing agent and the accelerator are added. A piston 14 pushes the mixture intended to form the packing substance through a pipe 17 towards a die chamber 18.

At the outlet of the die, the stranded core 19 passes through a first drawing machine 20 which surrounds it with a layer of polyethylene made semiconductive by adding carbon black, then through a second plasticizing machine 20A which surrounds it with a layer of electrically insulating polyethylene.

From there, it passes through a die 25 for forming an aluminium sheet around the insulated core.

Further, an aluminium sheet 22 supplied from a spool 21 is provided with longitudinal corrugations by passing between rollers 23. It is coated in its corrugations with a calibrated thickness of packing substance by a coating nozzle 24, then passes to a forming die 25 which bends it so as to make it surround the insulated core.

The core surrounded by the metal tape is then inserted in a plasticizing machine 26 which surrounds it with an outer sheath. The finished cable is stored on a take-up drum 27. A reinforcement of steel wires can possibly be previously added thereto.

The packing substance is hardened by baking the cable at 90° C. for 24 hours.

The cable thus obtained is perfectly sealed against water pressure of 15 bars.

I claim:

1. A semiconductor packing composition for packing a cable core made of conductors disposed axially, with said conductors being surrounded by a polyethylene layer which includes semiconductive material, then by a layer of insulating polyethylene, said packing composition comprising reticulated nitrile rubber with carboxylic bonds, an epoxy resin, carbon black with a specific surface area of at least 100 m$^2$/g, an anti-oxidizing agent and a reticulation accelerator.

2. A composition according to claim 1, wherein the anti-oxidizing agent is octyl diphenylamine.

3. A composition according to either one of claims 1 or 2, wherein the reticulation accelerator is tri (dimethylaminoethyl) phenol.

4. An undersea cable for transporting electric power, said cable comprising a core made of conductors disposed axially, a polyethylene layer surrounding said conductors, said layer including a semiconductive material, a layer of insulating polyethylene surrounding said polyethylene layer including said semiconductive material and a packing composition disposed between said conductors of the core and within said polyethylene layer including said semiconductive material, and wherein said packing composition comprises reticulated nitrile rubber with carboxylic bonds, an epoxy resin an anti-oxidizing agent, carbon black with a specific surface area of at least 100 m$^2$/g, and a reticulation accelerator.

5. A cable according to claim 4, which cable also has a metal screen around the layer of insulating polyethylene, said metal screen having longitudinal corrugations, wherein said packing composition is further disposed between the outer surface of the insulating polyethylene and the corrugations of the screen.

6. A method of manufacturing an undersea cable for transporting electrical power, said method comprising, in order, the steps of:

(a) forming a core by disposing conductors axially;
   (b) injecting between the conductors of the core a packing composition made of a mixture of liquid nitrile rubber with carboxylic bonds, an epoxy resin, carbon black whose specific surface area is at least equal to 100 m$^2$/g, an anti-oxidizing agent, and a reticulation accelerator;
   (c) surrounding the axially disposed conductors with a layer of polyethylene including semiconductive material; and
   (d) surrounding said layer of polyethylene including semiconductive material with a layer of insulating polyethylene, and wherein the step of forming the core by disposing conductors axially comprises assembling the conductors of the core to form a cord in a die, and wherein said method further comprises the steps of applying a metal screen around the layer of insulating polyethylene and depositing said packing composition additionally within said longitudinal corrugations between said metal screen and said layer of insulating polyethylene.

7. The method as claimed in claim 6, wherein said cable is further heat treated to speed up the hardening of the packing composition.

* * * * *